Aug. 13, 1940.    R. H. BROWN    2,211,096
MACHINE FOR SHELLING RICE AND OTHER HARD KERNELED GRAINS, SEEDS, AND BEANS
Filed June 3, 1939    2 Sheets-Sheet 1
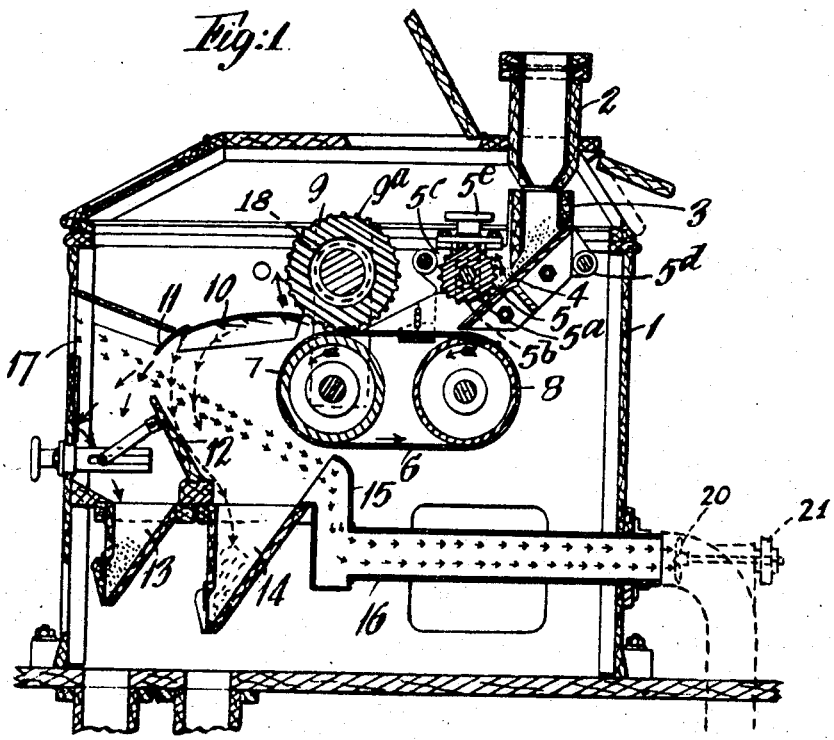
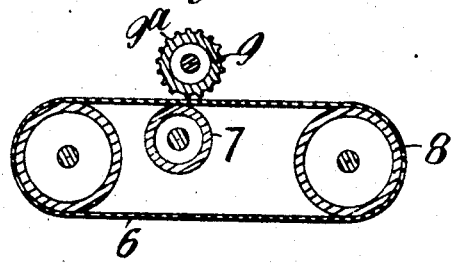
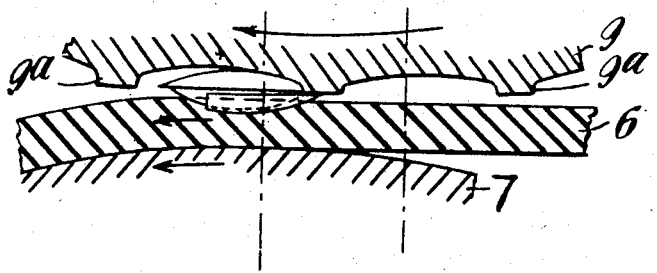
Inventor:
Robert Henry Brown
By Mocker Blum
Attorneys Inventor:
Robert Henry Brown
By Mock & Blum
Attorneys Patented Aug. 13, 1940

2,211,096

UNITED STATES PATENT OFFICE 2,211,096

MACHINE FOR SHELLING RICE AND OTHER HARD KERNELED GRAINS, SEEDS, AND BEANS

Robert Henry Brown, Westminster, London, England, assignor to W. E. Moulsdale & Co. Limited, London, England Application June 3, 1939, Serial No. 277,185
In Great Britain June 16, 1938

7 Claims. (Cl. 83—35)

This invention relates to a machine for shelling rice and other hard-kerneled grains, seeds, and beans of the type wherein the shelling surfaces comprise a hard toothed roller and an endless band of yielding resilient material running over rollers, and in which the pressure on a grain while the actual shelling is taking place is applied over the strongest part of the grain.

The present invention has for its object to provide a machine designed to permit the elimination of all sifting, aspirating, paddy-separating, re-hulling and other machines, with their necessary elevators, conveyors, bins, spouting, transmission gear and belting as hitherto employed in the commercial production of the clean shelled rice, free from unshelled grains, small brokens, cargo meal and husk (frequently known as brown rice, loonzain, or other local designation) which is required as the feed or semi-finished raw material of white rice milling plant in the preparation of table rice. All the subsidiary machines and plant as above specified, have hitherto been required because in no previously known machine for shelling has it been possible to shell more than a proportion of the raw rice or paddy fed in and the mixed product delivered has therefore to be treated through many other machines in series before being sufficiently purified to be spouted to the white rice side.

The whole of this preparatory plant as described is generally known as the cargo rice mill or plant, and it is the object of this invention therefore, to reduce the necessary cargo rice plant to a single machine which will deliver the semi-product required direct in one operation.

A secondary object of the invention is a more efficient re-hulling of the returns from paddy separators in existing mills already equipped with cargo rice plant on existing systems. Such returns almost invariably contain a considerable proportion of kernels or grains already shelled which are almost inevitably broken or damaged when again passed through shelling machines of previously known types, and the product delivered must again be treated through the subsidiary separating and purifying plant. When used for re-hulling therefore, the object of the invention is to deliver a pure shelled rice direct to the white rice plant and eliminate all secondary returns.

It is to be noted that the pure shelled rice feed to the white rice plant must be free from unshelled grains and the presence of even a small percentage of such would necessitate the use of subsequent separating machinery. For the elimination of all subsidiary plant, it is therefore necessary that in the machine employed, the shelling action shall be mechanically positive and shell every mature grain with certainty whatever its shape or size without breaking any sound grain, and then separate and remove the shells or husk completely without carrying off any particles of broken or other product of commercial value.

Although machines of the toothed roller and endless band type have already been proposed or employed, in some of which a shelling action analogous to that employed in the present invention has been proposed, the conditions governing certain mechanical shelling of every grain without appreciable breakage, irrespective of its shape or size, in a single nip demand a special technique with exact accordance of the construction, proportion and regulation of the shelling surfaces, which is not provided in any earlier machine.

In the known roller machines the conditions referred to are not, and cannot be met, and in practice a considerable proportion of grains fail to shell, either by slip of tooth over the grain or by the slip of the grain over the soft surface, or, if the pressure necessary to ensure certain shelling in such machines is applied to the grains, considerable breakage of the valuable kernels must result.

The basic principle of shelling between a fast toothed hard roller and a slower soft resilient band in a single nip between these surfaces is that the teeth of the hard roller grip and drive the grain on one side while pressing it into embedment on its other side until it becomes embedded to such a depth that the frictional resistance to sliding of the rough shell over the band surface causes the grain to hold momentarily and the drive of the tooth against the kernel forcing it forward then causes the brittle shell to give way and break up. The smooth-surfaced kernel when freed from the resistance of its shell will slide easily over the smooth inner surface of the torn shell still between it and the band, and the kernel and shells or husk are thrown out together when released from the nip.

In shelling machines embodying this principle, the axiomatic conditions for positive mechanical shelling of every grain without breakage are detailed hereunder. All references hereafter to a horizontal plane assume the working surface of the endless band to be horizontal, but are to be read as applying equally to hands inclined to the horizontal—the vertical plane thus means a plane normal to the working surface of the band. The term shelling roller means the hard fast-running toothed roller and anvil roller means a band carrying or supporting roller against or towards which the band is pressed when a grain is between the roller and band surfaces. The axiomatic conditions are:

A. A grain must not at any point in its travel be subjected to heavy pressure under a crown or crowns of the shelling roller teeth and the said crowns must be smooth and relatively wide so that they shall not exert any harmful shearing, cutting or driving action on a grain while passing over it if and when slip of the tooth over grain occurs.

B. The vertical reaction to pressure on a grain, provided by the resilience of the band material and/or the resistance of the band to deformation, must hold the grain continuously against the shelling roller, with sufficient force to ensure its being caused at some point to be fully entrained in a groove of the shelling roll during the time interval between the passing of two teeth over the grain.

C. While a grain is entrained within a groove of the shelling roller, the radial pressure must be applied by the floor of the groove only at or near the strongest part of the grain, that is, its central deepest section.

D. The clear width of the grooves in the shelling roller must be such that the longest grain to be shelled may lie lengthwise within the groove under condition C without being in contact with any part of more than one tooth. The circular pitch of the teeth must be as small as possible consistent with the latter requirement.

E. At some point in the arc of contact struck from the center of the shelling roller, the pressure on the thinnest grain to be shelled must cause its embedment in the band surface to a sufficient depth to hold it momentarily from moving relative to the band while the driving action of a tooth on its upper side is driving the kernel forward to break through the shell.

F. With the clearance between the surfaces set to ensure condition E for the thinnest grains, the consequent maximum embedment of the thickest grain at any point must not be such as to prevent all forward movement of the kernel and so cause the tooth to slip and force grain under the tooth crown.

G. The depth of the grooves in the shelling roller must be such that a tooth, on overtaking a grain at any point within its effective shelling arc, that is the arc of contact within which it is sufficiently embedded to resist sliding on the band, shall entrain and drive the grain from behind without slip of tooth over grain.

H. The differential velocity between the surfaces must be such that, assuming slip of tooth over a grain at beginning of its effective shelling arc, the next tooth shall overtake and start to drive the grain before it has passed out of the said arc. As the thinner the grain the shorter the arc the differential must be related to the effective arc for the thinnest grains.

I. Conditions E to H inclusive require that every grain shall pass through some point in its arc of contact with the surfaces where a tooth of the shelling roll shall be driving the grain while it is simultaneously suitably embedded to resist momentarily any slip on the band, but not so deeply embedded as to prevent forward drive of the grain sufficient to drive the kernel through the shell and over the band surface.

J. The highest pressure to which any sound grain is subjected during its travel through the nip between the surfaces must be less than its breaking strength under its conditions of loading at any point.

Unless every one of these essential conditions are met by the construction and operation of the shelling mechanism, positive shelling without breakage cannot be achieved. I have found that with the form of shelling roll teeth, with a disposition of the working rollers on a common centre line normal to the band, and regulation of pressure on the grains by increasing or decreasing the distance between the working surfaces, such as are specified or implied in earlier patents, that most of these ten conditions could not be met for all types and sizes of grains. Also in such machines their shelling efficiency is dependent upon using and maintaining a correct hardness and resilience in the material of the endless band, whereas these qualities are unavoidably affected by climatic conditions and the repeated compression effect against which no provision can be made for compensation. In practice, it is therefore found that both a considerable proportion of grains fail to shell and/or considerable breakage takes place under any possible adjustment or operation in such machines.

According to the present invention instead of arranging the shelling rollers and the anvil roller with their axes in a common plane normal to the band, the rollers are arranged in a manner such that the common plane in which their axes lie is so inclined with respect to the band that the grain must pass under the shelling roller before the band reaches solid contact with the anvil roller.

Preferably provision is made for adjusting the angle of the plane in which lie the axes of the rollers with respect to the band, which may be such as to enable this adjustment to be made whilst the machine is running, together with means for effecting the movement of the shelling roller towards and away from the working surface of the band to vary the amount of clearance between the shelling roller and the band. By these means, every one of the essential shelling conditions are met, and a special system of husk separation and removal is incorporated, so that the machine will deliver a pure shelled rice (brown rice or loonzain) requiring no further treatment, direct in one operation, from raw paddy of any known variety or size.

The invention will now be described, by way of example, with reference to the accompanying drawings, in which:

Fig. 1 is a longitudinal section of a machine according to the present invention.

Fig. 4 is a diagrammatic view showing a modified construction.

Fig. 5 is a view showing an alternative form of shelling roller.

Figure 2:
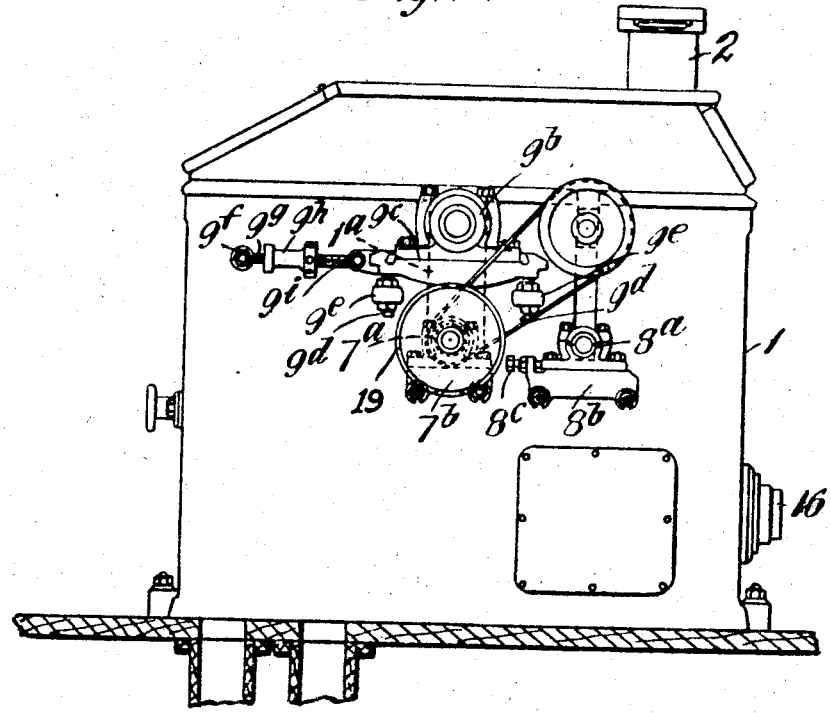
Fig. 2 is a side view.

Referring to Figs. 1 and 2 of the accompanying drawings, I indicates generally the frame of the machine. The grain to be shelled is fed in any suitable manner into a feed inlet box 2 which delivers the grain to the feed box 3, across the full width of the box 3 and on to an inclined feedplate 4, which may be grooved so that grains may travel lengthwise down its grooves.

Over the feedplate is provided a coarsely fluted feed roller 5 carried on a shaft 5a running in bearings 5b slidingly mounted in slots formed in side cheeks 5c of a frame 5d which carries the feedplate 4, the said bearings being made adjustable by means of screws carried by handwheels 5e, so as to vary the clearance between the feed roller and the feedplate.

The grains, after passing freely out of the box 3, are checked by the feed roller 5 and caused to pass down the feedplate through a narrow opening, formed between the roller and the feedplate, in a single layer extending over the full width of the plate. The roller 5 runs in the reverse direction to the flow of the grains and keeps the latter from jamming or wedging in the narrow opening.

From the bottom of the feedplate, the grains pass on to the upper surface of a relatively slow running endless band 6, of yielding resilient material such as rubber, which runs over rollers 7 and 8, rotating in bearings 7a and 8a respectively, which bearings are carried by platforms 7b and 8b which are in turn carried upon the side members of the frame 1.

The roller 7, which will hereinafter be termed the "anvil roller," is preferably mounted in a fixed position, and the bearings 8a of the roller 8 are slidingly mounted upon their platforms 8b so that they may be adjusted by bolts such as 8c to thereby maintain the belt 6 tightly stretched.

Figure 3:
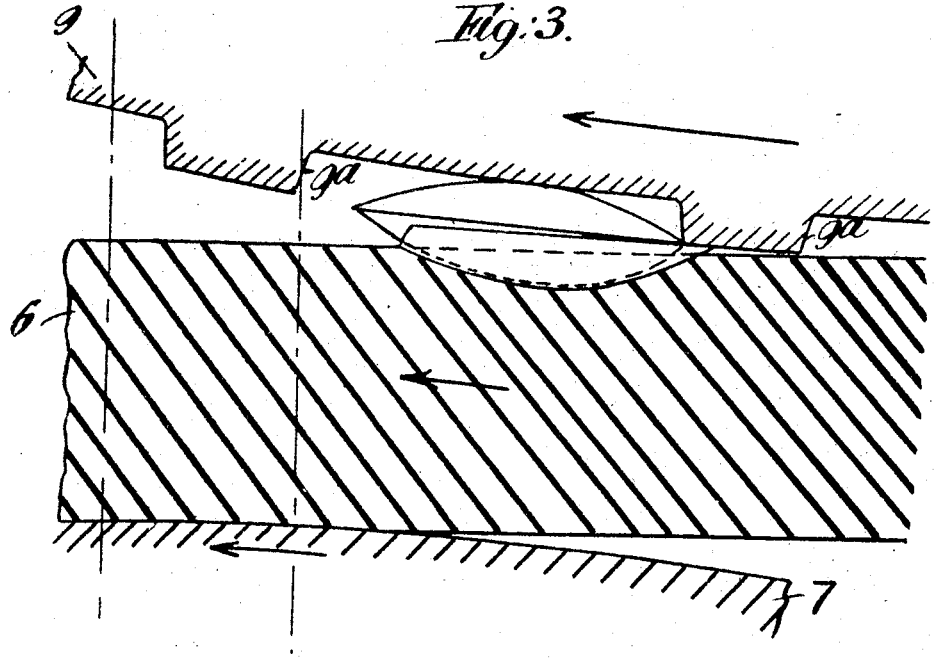
Fig. 3 is an enlarged fragmentary sectional view showing a selected form of shelling roller, whereby the pressure during the actual shelling is applied over the strongest part of the grain.

Above the anvil roller 7 is mounted a relatively fast-running hard shelling roller 9, provided with teeth 9a as shown more clearly in Fig. 3, upon its periphery, which teeth are arranged are arranged parallel to or slightly inclined to the axis of the roller.

The roller 9 is mounted in bearings such as 9b carried upon platforms such as 9c.

The side members of the frame 1 are provided with vertical slots 1a through which pass the ends of the roller 9, the width of these slots being considerably greater than the diameter of the roller parts passing through them.

The platforms 9c are mounted upon vertically adjustable bolts 9d carried by brackets 9e mounted upon the side members of the frame, the said platforms 9c resting upon the upper ends of these bolts in such a manner as to enable them to slide thereon in a horizontal plane.

Pivoted at 9f to each side member of the frame 1 is a short screwed spindle such as 9g, upon which is threaded a sleeve 9h which is at its other half portion threaded with a similarly handed screw but with slightly greater or lesser pitch to engage the correspondingly threaded outer end of an eye-bolt 9i pivoted to the adjacent platform 9c.

By rotating the sleeves 9h it is possible to make a fine adjustment of the horizontal location of the roller 9 with respect to the anvil roller 7, and by rotating the bolts 9d within the brackets 9e it is possible to adjust the vertical location of the roller 9 with respect to the roller 7.

The vertical adjustment determines the working clearance between the tooth crowns of the shelling roller and the band, and it is intended as a more or less permanent setting, while the horizontal adjustment may be effected while the machine is running.

The horizontal disposition of the shelling roller relative to the anvil roller, and the horizontal adjustment in combination with the special teeth and grooving of the shelling roller, form the distinguishing characteristics, as compared with all other roll and band machines, and radically modify the shelling action, pressures, and forces applied to a grain at every critical point throughout its travel through the nip between the surfaces, making the shelling of every grain mechanically positive without involving heavy pressures liable to break the grain.

The shelling roller 9, instead of being disposed on the same centre line normal to the band as the anvil roller, is arranged in a manner such that the common plane in which their axes lie is so inclined with respect to the band that the grain must pass under the shelling roller before the band reaches solid contact with its supporting roller 7, as more clearly shown in Fig. 4.

The form of tooth and groove and the relative proportion of tooth pitch to length of longest grain is shown more clearly in Fig. 3, the essential features being that the grain while contained within a groove is under pressure only from the floor of the groove applied at its thickest and strongest section, and free from any radial pressure by the crowns or points of the teeth, and that by reversing the roller in its bearings either edge of tooth may be used for driving.

The amount of the horizontal offset obtained by arranging the axes of the rollers as above described is made adjustable by any suitable means, but preferably by the means already described. This provides a delicate setting easily adjustable while the machine is running, and I distinguish this horizontal adjustment as "variable offset control."

The control gears are adjustable independently at each side to maintain the shelling roller in accurate train with the fixed anvil roller. The horizontal direction of adjustment may be parallel to the working surface of the band or the two planes may be slightly inclined towards each other in the direction of the grain flow but within normal limits of offset the line of adjustment may be considered as parallel to the band.

A grain having been delivered from the feedplate on to the band is carried by the latter into the nip between the shelling roller and band surfaces. The reaction to pressure on a grain in the nip necessary to hold it up to the shelling roller surface and into entrainment in a groove of the latter, is due partly to resilience of the band material and partly to resistance of the band to deflection, the latter increasing at a very rapid rate as the arm of the bending moment on the band under a grain decreases during the onward travel of the grain so that the effect of pressure under a grain is gradually transferred from deflection of the band to embedment of the grain on the surface of the band, the effect becoming entirely transferred to embedment when the band under a grain reaches solid contact with the anvil roller periphery. With the variable offset control described, the clearance between the shelling roller teeth and the band may be reduced to a minimum; therefore the maximum practicable depth of groove can be used and certainty of tooth drive without slip can be ensured.

On the leaving side of the shelling roller, the clearance between the nip surfaces is rapidly increasing as the grain travels onwards, and pressure causing embedment from this cause is therefore correspondingly decreasing, but the resistance of the band to deflection is increasing at a higher ratio, and the net pressure causing embedment is therefore increasing. By adjusting the offset distance therefore, every grain, whatever its thickness, and whatever the hardness degree of the band material, within wide limits, can be caused to pass through some point in its arc of contact on the leaving side of the nip at which all the requirements of positive shelling are met without having, during any part of its travel, been subjected to pressure heavy enough to break a sound grain. Every mature grain must therefore be shelled in a single nip between the surfaces. While positive shelling could be attained for one type or size of grain by setting the rollers at a fixed offset and adjusting the distance between the surfaces, it is only in combination with "variable offset control" at a suitable fixed distance or clearance between the surfaces that positive shelling of any size or type of grain without breakage can be ensured.

Over the delivery side of the nip of the rollers is fixed a suitable curved impact plate 10, with a momentum absorbing curtain or apron 11 and below plate 10 a hinged husk divider board or valve 12 dividing the delivery end of the machine into two compartments with hoppered bottom outlets 13 and 14, preferably fitted with air-excluding valves. At rear of the second chamber, below the band, is fitted a dust or husk collecting hood 15, to which is connected an air duct 16, through which the husk and/or dust may be drawn out by a suitable exhaust fan. An air inlet 17 is provided in front end frame.

After the grains have passed through the nip of the rollers, the lower shells travelling still at the relatively slow band speed are separately thrown out and fall in a comparatively steep curve directly into the husk compartment 14, thus immediately delivering about one half the total husk without artificial separation.

The stream of shelled kernels mixed with the husk from the upper half shells is thrown out in a very wide thin stream at the high shelling roller velocity and strikes the under side of the impact plate 10, and the particles are reflected therefrom at approximately equal angles of incidence, following more or less closely the curve of the plate. The smooth surface of the shelled kernels present very little resistance to the air through which they are thrown and their high momentum carries them on to strike the apron 11 and fall thence into the clean rice delivery hopper outlet 13. The husk particles in the mixture have relatively rough surfaces presenting much greater resistance to travel through the air than the rice, so that they quickly lose velocity and momentum and tend to fall always in a steeper curve owing to which they can be caused to fall on the inner side of the adjustable dividerboard 12, into the husk compartment 14, and may be delivered along with the husk from the band through the hoppered outlet below. A fairly sharp natural separation can thus be effected without the aid of any aspiration, but preferably a current of air, in the opposite direction to the stream of mixed product thrown forward by the shelling roller action, is induced by a fan 20 driven through a pulley 21, the direction of the said air current being shown by the small arrows as shown in Fig. 1. This air current entering inlet 17 across full width of the machine passes first through the heavy rice as it falls into chamber 13, cleaning it of any husk particles which may have been carried over, thence over the narrow opening between impact plate and divider board, and, directly opposing the travel of the light husk particles, effectively prevents them passing over divider board with the heavy rice, and the air immediately losing a great part of its velocity as it streams into chamber 14, the husk quickly drops out and is delivered separately from the rice through hopper below. Under these conditions, a gentle air current is sufficient to effect a perfect cleaning of the rice and sharp separation of the husk. If, however, it is desired to deliver the husk to some distance as, for instance, to deliver it direct to the boiler house for use as fuel, a high velocity current to carry husk through the suction duct to the fan can be used, the compartment 14 then acting as a settling chamber for any rice or brokens carried back by the air at its highest velocity point over the divider board.

A machine as described can therefore produce pure shelled or brown rice in one operation, thus eliminating all the sifting, blowing or aspirating, paddy separating and re-hulling machines, with elevating, conveying, transmission and other plant now necessary for treating the product as delivered by rice hulling or shelling machines previously known.

Instead of the teeth and grooves of the shelling roller being as shown in Figs. 1 and 3, this roller may be constructed as shown in Fig. 5.

The drive to the machines is applied to the shelling roller through a pulley 18 (shown in interrupted lines in Fig. 1), and to the band roller 7 through a pulley 19.

I claim:

1. A machine for shelling rice and other hard kerneled grains, seeds, or beans, comprising a continuously running endless band formed of resilient material, means for feeding the grain on to said band, rollers carrying said band, one of said rollers acting as an anvil roller to support the band directly at the point where the shelling takes place, a shelling roller mounted in cooperative relationship with said anvil roller and with its axis disposed, together with the axis of said anvil roller, in a plane inclined to the plane of said band so that the lower portions of the grains first become embedded, by said shelling roller, in the surface of a portion of said band which has not yet reached supporting contact with said anvil roller and is therefore capable of being flexed, by the action of said shelling roller, out of its normal path of movement, means for driving said band and shelling roller such that their effective surfaces run at different linear speeds, and teeth extending longitudinally of said shelling roller, pitched to permit a grain to lie lengthwise of the band when entrained between two of them and said band, without being in contact with more than one part of one of said teeth, for the upper half shell to be sheared off the lower half, and of such shape that their outer ends slip over the upper surface of any misplaced grains during said flexing of the band so that when a gap between two successive teeth reaches said misplaced grain the latter will be sprung up, under the action of the belt, into correct shell shearing engagement within said gap, said teeth being of such depth that the radial pressure applied to the grain by the part of said shelling roller between said teeth is at or near the strongest part of the grain.

2. A machine for shelling rice and other hard kerneled grains, seeds, or beans, comprising a continuously running endless band formed of resilient materal, means for feeding the grain on to said band, rollers carrying said band, one of said rollers acting as an anvil roller to support the band directly at the point where the shelling takes place, a shelling roller, means for driving said band and said shelling roller such that their effective surfaces run at different linear speeds, teeth running longitudinally of said shelling roller, said teeth being so pitched as to permit a grain to lie lengthwise when entrained between two of them and the band without being in contact with more than one part of one of said teeth for the upper half shell to be sheared off the lower half and of such depth that the radial pressure applied to the grain by the part of the roller between said teeth is at or near the strongest part of the grain, the common plane in which lie the axes of the shelling and anvil rollers being so inclined with respect to the band that each grain must pass into contact with the effective portion of the shelling roller before that part of the band supporting the grain reaches solid contact with the anvil roller in order to enable said teeth to slide over the grain until the latter are properly entrained between successive teeth and the band, and means whereby the angle of inclination of the plane common to the axes of the anvil and shelling rollers with respect to the band, may be altered during the running of the machine, together with means whereby the clearance between the shelling roller and the band may also be varied during the running of the machine.

3. A machine for shelling rice and other hard kerneled grains, seeds, or beans, comprising a continuously running endless band formed of resilient material, means for feeding the grain on to said band, rollers carrying said band, one of said rollers acting as an anvil roller to support the band directly at the point where the shelling takes place, a shelling roller, means for driving said band and said shelling roller such that their effective surfaces run at different linear speeds, teeth running longitudinally of said shelling roller, each tooth having symmetrical driving flanks, said teeth being so pitched as to permit a grain to lie lengthwise when entrained between two of them and the band without being in contact with more than one part of one of said teeth for the upper half shell to be sheared off the lower half and of such depth that the radial pressure applied to the grain by the part of the roller between said teeth is at or near the strongest part of the grain, the common plane in which lie the axes of the shelling and anvil rollers being so inclined with respect to the band that each grain must pass into contact with the effective portion of the shelling roller before that part of the band supporting the grain reaches solid contact with the anvil roller, in order to enable said teeth to slide over the grain until the latter are properly entrained between successive teeth and the band, and means whereby the angle of inclination of the plane common to the axes of the anvil and shelling rollers with respect to the band may be altered during the running of the machine, together with means whereby the clearance between the shelling roller and the band may also be varied during the running of the machine.

4. A machine for shelling rice and other hard kerneled grains, seeds, or beans, comprising a continuously running endless band formed of resilient material, means for feeding the grain onto said band, rollers carrying said band, one of said rollers acting as an anvil roller to support the band directly at the point where the shelling takes place, a shelling roller, means for driving said band and said shelling roller such that their effective surfaces run at different linear speeds, teeth running longitudinally of said shelling roller, each tooth having symmetrical flanks and having the surface of the roller between the teeth outwardly curved, said teeth being so pitched as to permit a grain to lie lengthwise when entrained between two of them and the band without being in contact with more than one part of one of said teeth for the upper half shell to be sheared off the lower half and of such depth that the radial pressure applied to the grain by the part of the roller between said teeth is at or near the strongest part of the grain, the common plane in which lie the axes of the shelling and anvil rollers being so inclined with respect to the band that each grain must pass into contact with the effective portion of the shelling roller before that part of the band supporting the grain reaches solid contact with the anvil roller in order to enable said teeth to slide over the grain until the latter are properly entrained between successive teeth and the band, and means whereby the angle of inclination of the plane common to the axes of the anvil and shelling rollers with respect to the band may be altered during the running of the machine, together with means whereby the clearance between the shelling roller and the band may also be varied during the running of the machine.

5. A machine for shelling rice and other hard kerneled grains, seeds, or beans, comprising a continuously running endless band formed of resilient material, means for feeding the grain on to said band, rollers carrying said band, one of said rollers acting as an anvil roller to support the band directly at the point where the shelling takes place, a shelling roller, means for driving said band and said shelling roller such that their effective surfaces run at different linear speeds, teeth running longitudinally of said shelling roller, each tooth having symmetrical flanks and having the surface of the roller between the teeth inwardly curved, said teeth being so pitched as to permit a grain to lie lengthwise when entrained between two of them and the band without being in contact with more than one part of one of said teeth for the upper half shell to be sheared off the lower half and of such depth that the radial pressure applied to the grain by the part of the roller between said teeth is at or near the strongest part of the grain, the common plane in which lie the axes of the shelling and anvil rollers being so inclined with respect to the band that each grain must pass into contact with the effective portion of the shelling roller before that part of the band supporting the grain reaches solid contact with the anvil roller in order to enable said teeth to slide over the grain until the latter are properly entrained between successive teeth and the band and means whereby the angle of inclination of the plane common to the axes of the anvil and shelling rollers with respect to the band may be varied during the running of the machine, together with means whereby the clearance between the shelling roller and the band may be varied during the running of the machine.

6. A machine for shelling rice and other hard kerneled grains, seeds, or beans, comprising a closed casing containing a continuously running endless band formed of resilient material, means for feeding the grain onto said band, rollers carrying said band, one of said rollers acting as an anvil roller to support the band directly at the point where shelling takes place, a shelling roller, means for driving said band and said shelling roller such that their effective surfaces run at different linear speeds, teeth running longitudinally of said shelling roller, said teeth being so pitched as to permit a grain to lie lengthwise when entrained between two of them and the band without being in contact with more than one part of one of said teeth for the upper half shell to be sheared off the lower half and of such depth that the radial pressure applied to the grain by the part of the roller between said teeth is at or near the strongest part of the grain, the common plane in which lie the axes of the shelling and anvil rollers being so inclined with respect to the band that each grain must pass into contact with the effective portion of the shelling roller before that part of the band supporting the grain reaches solid contact with the anvil roller in order to enable the outer ends of said teeth to slide over the grain until the latter are properly entrained between successive teeth and the band, a husk receiving compartment located so that the lower halves of the husks fall into same, off the inner end of the band, a kernel receiving compartment situated upon the side of said husk receiving compartment remote from said band, a plate inclined into the path in which the kernels and upper halves of the husks are projected by the shelling roller so that they impact thereagainst and thereby cause said upper husk portions, by reason of their low momentum and high frictional resistance, to drop into the husk receiving compartment, while the kernels continue to travel under their momentum, and an apron arranged in the path of this continued movement of the kernels in order to deflect the latter into said kernel receiving compartment.

7. A machine for shelling rice and other hard kerneled grains, seeds, or beans, comprising a closed casing containing a continuously running endless band formed of resilient material, means for feeding the grain onto said band, rollers carrying said band, one of said rollers acting as an anvil roller to support the band directly at the point where shelling takes place, a shelling roller, means for driving said band and said shelling roller such that their effective surfaces run at different linear speeds, teeth running longitudinally of said shelling roller, said teeth being so pitched as to permit a grain to lie lengthwise when entrained between two of them and the band without being in contact with more than one part of one of said teeth for the upper half shell to be sheared off the lower half and of such depth that the radial pressure applied to the grain by the part of the roller between said teeth is at or near the strongest part of the grain, the common plane in which lie the axes of the shelling and anvil rollers being so inclined with respect to the band that each grain must pass into contact with the effective portion of the shelling roller before that part of the band supporting the grain reaches solid contact with the anvil roller in order to enable the outer ends of said teeth to slide over the grain until the latter are properly entrained between successive teeth and the band, a husk receiving compartment located so that the lower halves of the husks fall into same, off the inner end of the band, a kernel receiving compartment situated upon the side of said husk receiving compartment remote from said band, a plate inclined into the path in which the kernels and upper halves of the husks are projected by the shelling roller so that they impact thereagainst and thereby cause said upper husk portions, by reason of their low momentum and high frictional resistance, to drop into the husk receiving compartment, while the kernels continue to travel under their momentum, and an apron arranged in the path of this continued movement of the kernels in order to deflect the latter into said kernel receiving compartment, an adjustable division plate between said compartments whereby the effective area of the opening between them may be increased or decreased while the machine is running, an aspirator fan, a duct connected to said fan and to the rear lower end of the husk compartment so that said fan draws a current of air through the opening between the said compartments to ensure that none of the husk portions shall travel onwards through the opening into the kernel receiving compartment, and to draw off any dust.

ROBERT HENRY BROWN.